S. E. LYON.
SPOON HOLDER.
APPLICATION FILED MAY 22, 1912.
1,062,107.
Patented May 20, 1913.
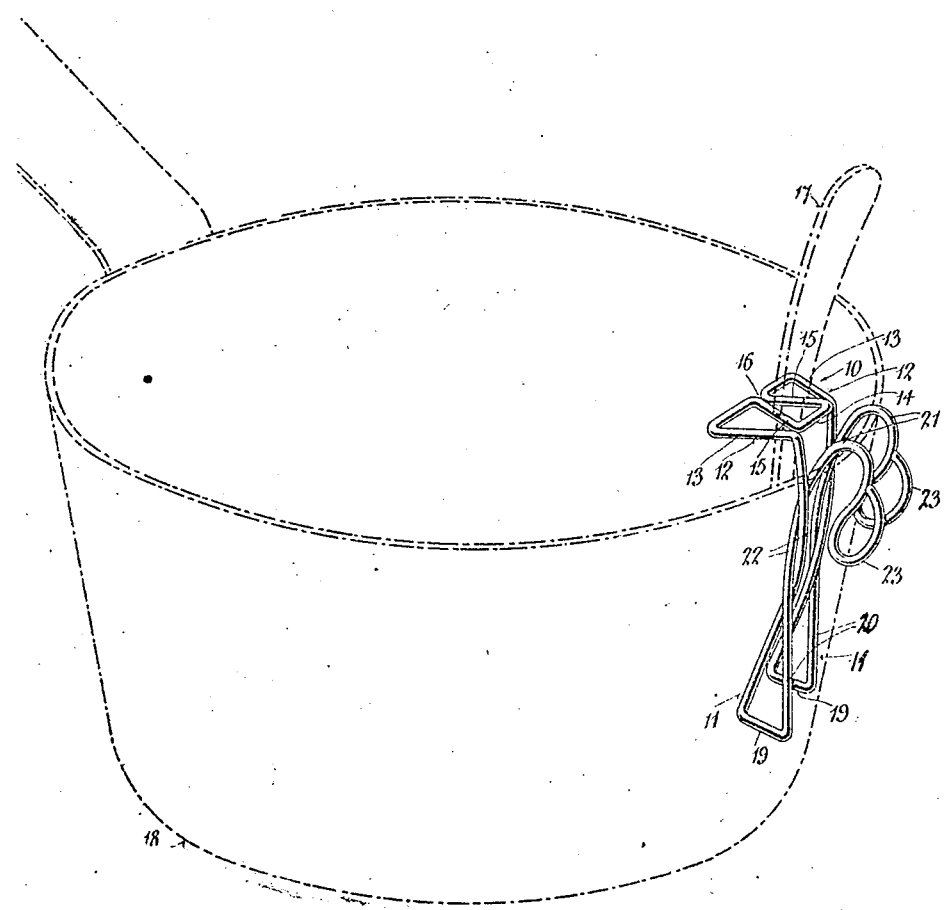

UNITED STATES PATENT OFFICE.

SARAH E. LYON, OF MENOMINEE, MICHIGAN.

SPOON-HOLDER.

1,062,107.

Specification of Letters Patent.

Patented May 20, 1913.

Application filed May 22, 1912. Serial No. 699,015.

*To all whom it may concern:*

Be it known that I, SARAH E. LYON, a citizen of the United States, residing at Menominee, in the county of Menominee, State of Michigan, have invented certain new and useful Improvements in Spoon-Holders; and I do hereby declare the following to be a full, clear, and exact description of the invention, such as will enable others skilled in the art to which it appertains to make and use the same.

This invention appertains to new and useful improvements in spoon holders and the purpose of the invention consists in the provision of a spoon holder for engaging the rim or ledge of a kettle or other receptacle to support a spoon and prevent the same from slipping into the receptacle.

Specifically, the invention consists in the provision of a spoon holder which is formed from a single section or strand of resilient wire bent in a novel manner to firmly grip the receptacle and accommodate spoons of various sizes.

With the above and other objects in view, the invention consists of certain other combinations and arrangements of parts as will be hereinafter more fully described, claimed and illustrated in the accompanying drawings, in which:

The figure is a perspective view of my improved spoon holder engaged on a cooking vessel and supporting a spoon, the vessel and spoon being shown in phantom.

As illustrated, my improved spoon holder comprises a single strand of wire indicated generally by the numeral 10, said section or strand of wire being rebent to provide a pair of vertical and spaced parallel leg portions 11 which have their upper portions bent inwardly at right angles as shown at 12 to provide horizontal divergent side portions 13 while the connecting portion 14 is bent outwardly to provide a spoon receiving socket within the area of the side portions 13. The side portions 15 of the socket converge inwardly to produce substantially, three triangular frames including the socket portion which has a restricted throat 16 for the insertion of the spoon therein. It will also be observed that the socket portion of the holder is inclined inwardly and downwardly to suspend the spoon indicated by the numeral 17 near the throat portion of the socket and within the cooking utensil 18, thereby supporting the spoon and preventing the same from slipping into the receptacle or utensil as well as accommodating spoons of various sizes. The leg portions 11 are rebent twice at right angles intermediate of their ends to form lower horizontal connecting portions 19 and the forwardly extending portions 20 thus provided have their upper extremities bent or curved outwardly and downwardly to provide resilient gripping portions 21 to tightly clamp the ledge of the cooking utensil or receptacle at its outer face. The portions 11 and 20 are then intertwisted by extending the portions 20 inwardly around the portions 11 as shown at 22 whereby said portions are bent in arcuate form with their upper extremities spaced apart slightly to tightly clamp the receptacle when the depending side portions thus produced engage the inner wall of the receptacle. The extreme portions of the clamping members 21 are also curved outwardly and upwardly to form spaced parallel gripping eyes or loops 23 to be grasped by the operator in conveniently engaging the holder with a receptacle or disengaging the same therefrom.

From the foregoing description in connection with the accompanying drawings, it will be evident that a spoon holder made in accordance with the invention will be produced from a single section of resilient wire which may be readily bent into shape and which will similarly engage the ledge of a receptacle in which the spoon is to be supported while the depending side portions of the holder will be braced against the inner wall of the receptacle and thus fully sustain the weight of heavy spoons.

I claim:

A spoon holder formed of a single strand of wire bent intermediate of its ends to provide leg portions having their upper extremities bent inwardly to assume a horizontal position and having their connected portion bent in an opposite direction therebetween to provide a triangular socket for receiving a spoon, said leg portions being rebent upwardly and intertwisted with the leg portions and then curved outwardly and downwardly to provide clamping portions to engage a receptacle and the extremities of the leg portions being bent upwardly and inwardly to provide spaced gripping loops.

In testimony whereof, I affix my signature, in presence of two witnesses.

SARAH E. LYON.

Witnesses:
 ELIZABETH A. CRUICKSHICK,
 JAS. C. SHERMAN.